United States Patent
Masunaga (10) Patent No.: US 8,894,199 B2
(45) Date of Patent: Nov. 25, 2014

(54) SPECTACLES FRAME AND TEMPLE MEMBERS OF THE SAME

(71) Applicant: Masunaga Optical Mfg. Co., Ltd., Fukui (JP)

(72) Inventor: Satoru Masunaga, Fukui (JP)

(73) Assignee: Masunaga Optical Mfg. Co., Ltd., Fukui (JP)

( * ) Notice: Subject to any disclaimer, the term of this patent is extended or adjusted under 35 U.S.C. 154(b) by 0 days.

(21) Appl. No.: 14/170,154

(22) Filed: Jan. 31, 2014

(65) Prior Publication Data

US 2014/0218675 A1 Aug. 7, 2014

Related U.S. Application Data

(63) Continuation of application No. PCT/JP2013/000641, filed on Feb. 6, 2013.

(51) Int. Cl.
*G02C 5/16* (2006.01)

(52) U.S. Cl.
CPC .......................................... *G02C 5/16* (2013.01)
USPC ............................. 351/114; 351/111; 351/113

(58) Field of Classification Search
CPC ........... G02C 2200/22; G02C 2200/16; G02C 5/2254; G02C 5/2227; G02C 5/008; G02C 5/16
USPC .......................................... 351/111, 113, 114
See application file for complete search history.

(56) References Cited

U.S. PATENT DOCUMENTS

| 5,818,567 A | * | 10/1998 | Sakai | 351/113 |
| 2011/0069275 A1 | * | 3/2011 | Ohno et al. | 351/113 |
| 2011/0181830 A1 | * | 7/2011 | Iimura | 351/153 |

FOREIGN PATENT DOCUMENTS

| JP | U-6-40921 | 5/1994 |
| JP | A-2007-101975 | 4/2007 |
| JP | A-2008-76743 | 4/2008 |

* cited by examiner

*Primary Examiner* — Scott J Sugarman
*Assistant Examiner* — Daniele Manikeu
(74) *Attorney, Agent, or Firm* — Oliff PLC (57) ABSTRACT

A pair of spectacles is provided, wherein a temple main body includes a plate spring section formed to a side of the front frame; and a highly rigid section formed to a rear side of the plate spring section with the ear suspension section inclusive and having bending rigidity higher than that of the plate spring section while the plate spring section is formed in such a manner that its vertical width is rendered constant or tapered with narrowed by a predetermined ratio from its frontal side to its rear side as well as such that a thickness of the plate spring section satisfies the predetermined equation in relation with vertical widths of the plate spring section, positions in a longitudinal direction thereof and an abutment position with the lateral side of the head at the highly rigid section.

6 Claims, 3 Drawing Sheets

| No. | l | x | 214.5(l+65−x)/l(−1.7x+325) | z |
|---|---|---|---|---|
|  | 30 | 0 | 2.09 | 1.01 |
|  | 30 | 5 | 2.03 | 1.00 |
| 1 | 30 | 10 | 1.97 | 0.98 |
| 2 | 30 | 15 | 1.91 | 0.97 |
| 3 | 30 | 20 | 1.84 | 0.95 |
| 4 | 30 | 25 | 1.77 | 0.93 |
| 5 | 30 | 30 | 1.70 | 0.91 |
| 6 | 30 | 35 | 1.62 | 0.89 |
| 7 | 30 | 40 | 1.53 | 0.87 |
| 8 | 30 | 45 | 1.44 | 0.84 |
| 9 | 30 | 50 | 1.34 | 0.81 |
| 10 | 30 | 55 | 1.24 | 0.78 |
| 11 | 30 | 60 | 1.12 | 0.74 |
| 12 | 30 | 65 | 1.00 | 0.7 |

| No. | l | x | 214.5(l+65-x)/l(-1.7x+325) | z |
|---|---|---|---|---|
|  | 30 | 0 | 2.09 | 0.89 |
|  | 30 | 5 | 2.03 | 0.89 |
| 1 | 30 | 10 | 1.97 | 0.88 |
| 2 | 30 | 15 | 1.91 | 0.87 |
| 3 | 30 | 20 | 1.84 | 0.86 |
| 4 | 30 | 25 | 1.77 | 0.85 |
| 5 | 30 | 30 | 1.70 | 0.83 |
| 6 | 30 | 35 | 1.62 | 0.82 |
| 7 | 30 | 40 | 1.53 | 0.81 |
| 8 | 30 | 45 | 1.44 | 0.79 |
| 9 | 30 | 50 | 1.34 | 0.77 |
| 10 | 30 | 55 | 1.24 | 0.75 |
| 11 | 30 | 60 | 1.12 | 0.73 |
| 12 | 30 | 65 | 1.00 | 0.70 |

Fig. 5

SPECTACLES FRAME AND TEMPLE MEMBERS OF THE SAME

TECHNICAL FIELD

The present invention relates to improvement on a spectacles frame and temple members of the frame, in details, pertaining to such frame and temple members thereof excellent in functionality whose elastic members are hard to deteriorate in strength even when they might be repetitiously used for a long time and which cause no great fluctuation in the sense of fitness on the part of wearers owing to difference in their head sizes.

BACKGROUND ART

As known, in general, with the spectacles frame, it is provided with a temple having a suspension member on the ear on both sides of the front frame. However, just with the temples suspended on the ears, the spectacles are vulnerable to being detached with ease by a slight impact on the face or through a physical exercise, so that it is often that a spring hinge is adopted for the hinge section thereof such that the unfolded temples are energized to the lateral sides of the head.

Further, besides such spring hinge, such technique is well-known (refer to Patent Literature 1) as such elastic members as made from titanium alloy and so forth being adopted for the spectacles temples in order to improve on the sense of fitness on the part of users, but with this prior art, upon the temples being unfolded, such elastic members bend in a non-uniform manner (owing to the fact that strain is not uniformly applied thereto and curvature is inconsistent), so that load concentrates on a portion where large strain is applied so as to invite bending fatigue thereon.

Moreover, when there is inconsistency in strain and so forth applied to the elastic members comprising the temples as mentioned above, the sense of fitness on wear varies according to a person to a person. Concretely speaking, when such spectacles frame is worn by a person whose head size is larger, it compresses the lateral sides of the head so hard that he/she feels uncomfortable whereas when it is worn by a person whose head size is smaller, it compresses them so weak that the stability with which it is worn fails.

On the other hand, conventionally, such spectacles frame is known (refer to Patent Literature 2) as the thickness of the temple made from an elastic material being partly modified so that the thinner portion thereof being subjected to bending strain, but as with such prior art, load concentrates on such thinner portion with large strain and the like applied thereto, so that bending fatigue locally occurs thereon, with the result that the elasticity of the frame deteriorates.

Likewise, such technique is known (refer to Patent Literature 3) as manufacturing the temples with elastic materials different in bending rigidity combined in order to provide adequate clamping force on wear, as with which prior technique as well, it results in concentrating load on elastic materials lower in bending rigidity so that the portions whose bending rigidity is lower are vulnerable to bending fatigue through repeated bending strain.

CITATION LIST

Patent Literature

Document 1: Japanese Utility Model Unexamined Application Publication No. HEI 06 (1994)-40921

Document 2: Japanese Patent Unexamined Application Publication No. 2008-76743

Document 3: Japanese Patent Unexamined Application Publication No. 2007-101975

SUMMARY OF INVENTION

Technical Problem

In view of the above-mentioned inconveniences caused by the prior art, the present invention is to provide a spectacles frame and temple members of the same, the strength of which elastic members is hard to deteriorate even when the spectacles might have been repetitiously worn during a long duration of time and which do not cause large fluctuation in the sense of fitness on the part of the wearers owing to the size difference of the users' heads.

Solution to Problem

The means to solve the above-mentioned problem adopted by the inventor is explained below with reference to the accompanying drawings.

That is to say, as with a pair of right and left temple members whose frontal end portions are connected to both ends of a front frame F and whose rear end portions are provided with an ear suspension section 12a in abutment with a lateral side of a wearer's head, the present invention is characterized in that a temple main body 1 comprises a plate spring section 11 formed to a side of the front frame F; and a highly rigid section 12 whose bending rigidity is larger than that of the plate spring section 11, the highly rigid section being formed to a rear side of the plate spring section 11 with the ear suspension section 12a inclusive, in which the plate spring section 11 is formed such that a vertical width of the same is rendered constant or such width is narrowed or tapered with a predetermined ratio from a frontal side to a rear side thereof and such that a thickness of the plate spring section 11 satisfies the following equation 1 in relation with the vertical widths of the plate spring section 11, positions in the longitudinal direction thereof and an abutment position with the lateral side of the head at the highly rigid section 12 and as such.

$$z = Z_0 \sqrt{\frac{Y_0(\ell + X_0 - x)}{y\ell}} \qquad \text{[Equation 1]}$$

x: Length of the plate spring section from its frontal end to its arbitrary point P $X_0$: Length of the plate spring section from its frontal end to its rear end y: Vertical width of the plate spring section at its arbitrary point P $Y_0$: Vertical width of the plate spring section at its rear end z: Thickness of the plate spring section at its arbitrary point P $Z_0$: Thickness of the rear end of the plate spring section l: Length of the highly rigid section from its frontal end to the position A in abutment with the lateral side of the head (l>0)

*y is a constant or a function of X

Further, as for the equation 1 by which the thickness of the above-mentioned plate spring section 11 is calculated, where not strain but curvature is rendered constant, it may well be arranged such that the thickness of the plate spring section 11 satisfies the following equation 3 in relation with the vertical widths of the plate spring section 11, positions in the longitudinal direction thereof and an abutment position with the lateral side of the head at the highly rigid section 12 and as such.

$$y = \frac{Z_0^2 Y_0(\ell + X_0 - x)}{z^2 \ell} \quad \text{[Equation 2]}$$

x: Length of the plate spring section from its frontal end to its arbitrary point P $X_0$: Length of the plate spring section from its frontal end to its rear end y: Vertical width of the plate spring section at its arbitrary point P $Y_0$: Vertical width of the plate spring section at its rear end z: Thickness of the plate spring section at its arbitrary point P $Z_0$: Thickness of the rear end of the plate spring section l: Length of the highly rigid section from its frontal end to the position A in abutment with the lateral side of the head (l>0)

*z is a constant or a function of X

On the other hand, as for the above-mentioned plate spring section 11, it may well be arranged such that its thickness is rendered constant or narrowed (tapered) from its frontal side to its rear side with a predetermined ratio, in which case it may well be arranged such that the vertical width of the plate spring section 11 satisfies the above equation 2 in relation with the thicknesses of the plate spring section 11, positions in the longitudinal direction thereof and an abutment position with the lateral side of the head at the highly rigid section 12 and as such.

$$z = Z_0^3 \sqrt{\frac{Y_0(\ell + X_0 - x)}{y\ell}} \quad \text{[Equation 3]}$$

x: Length of the plate spring section from its frontal end to its arbitrary point P $X_0$: Length of the plate spring section from its frontal end to its rear end y: Vertical width of the plate spring section at its arbitrary point P $Y_0$: Vertical width of the plate spring section at its rear end z: Thickness of the plate spring section at its arbitrary point P $Z_0$: Thickness of the rear end of the plate spring section l: Length of the highly rigid section from its frontal end to the position A in abutment with the lateral side of the head (l>0)

*y is a constant or a function of X

Further, as for the above equation 2 by which the vertical width of the above-mentioned plate spring section 11 is calculated, where curvature is rendered constant, it may well be arranged such that the vertical width of the plate spring section 11 satisfies the following equation 4 in relation with the thicknesses of the plate spring section 11, positions in the longitudinal direction thereof and an abutment position in the lateral side of the head at the highly rigid section 12 and as such.

$$y = \frac{Z_0^3 Y_0(\ell + X_0 - x)}{z^3 \ell} \quad \text{[Equation 4]}$$

x: Length of the plate spring section from its frontal end to its arbitrary point P $X_0$: Length of the plate spring section from its frontal end to its rear end y: Vertical width of the plate spring section at its arbitrary point P $Y_0$: Vertical width of the plate spring section at its rear end z: Thickness of the plate spring section at its arbitrary point P $Z_0$: Thickness of the rear end of the plate spring section l: Length of the highly rigid section from its frontal end to the position A in abutment with the lateral side of the head (l>0)

*z is a constant or a function of X

Furthermore, as with the plate spring section 11 of the above temple main body 1, it may well be arranged such that it is formed with the thin plate sections 11a and 11b vertically disposed whose in-between portion is hollowed out in such a manner that those thin plates satisfy the conditions on the thicknesses and vertical widths of the plate spring section 11 as defined with the above-mentioned equations.

Moreover, according to the present invention, the plate spring section may well be formed not only on the temple members, but also on the front frame or brace bars, in which such plate spring section can be manufactured into a shape to make the strain or curvature of such plate spring section as a whole substantially constant upon the same being subjected to load applied to one end or both ends thereof so as to be curved.

Advantageous Effect

Forming the plate spring section of the spectacles frame according to the present invention such that its vertical width and thickness satisfy the predetermined equations allows the strain and curvature of the plate spring section as a whole to be rendered substantially constant. This prevents load from locally concentrating on a portion of such plate spring section when the spectacles are in use or leads to dispersing load applied to the plate spring section uniformly, so that bending fatigue of such section is hard to happen even when the spectacles might be used for a long period of time.

In addition, making the strain and so forth of the plate spring section of the temples substantially constant overcomes the problem with the clamping force applied to the lateral sides of the head going overboard or to the contrary when the temples are unfolded in use, which permits users having different head sizes to feel the similar sense of fitness in common when they put on the spectacles frame according to the present invention.

Summing up, the present invention permits not only a greater number of users to put on a pair of spectacles more comfortably, but also an endurable spectacles frame whose elastic members are hard to deteriorate in strength to be provided even when the spectacles might have been repetitiously taken on and off during a long period of time, so that the industrial applicability of the present invention is very high.

DESCRIPTION OF EMBODIMENTS

First Example

The first example of the present invention is explained with reference to FIGS. 1 to 3, in which a reference numeral 1 and a reference symbol F indicate a temple main body made from metal and a front frame respectively; a reference symbol A indicates an abutment position with the lateral sides of the head; and a reference symbol P indicates an arbitrary point.

Figure 1:
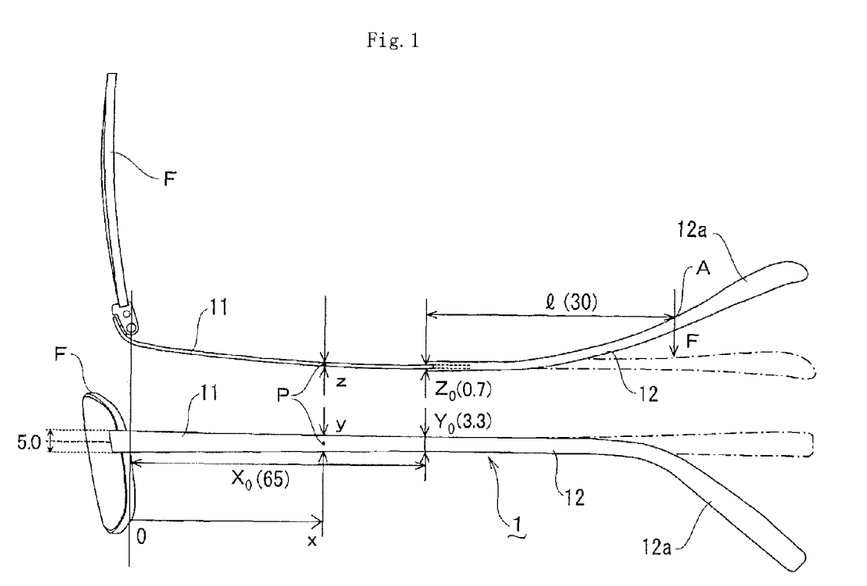
FIG. 1 shows a side view and a plan view of the temple member of the spectacles frame according to the first example of the present invention.
Figure 2:
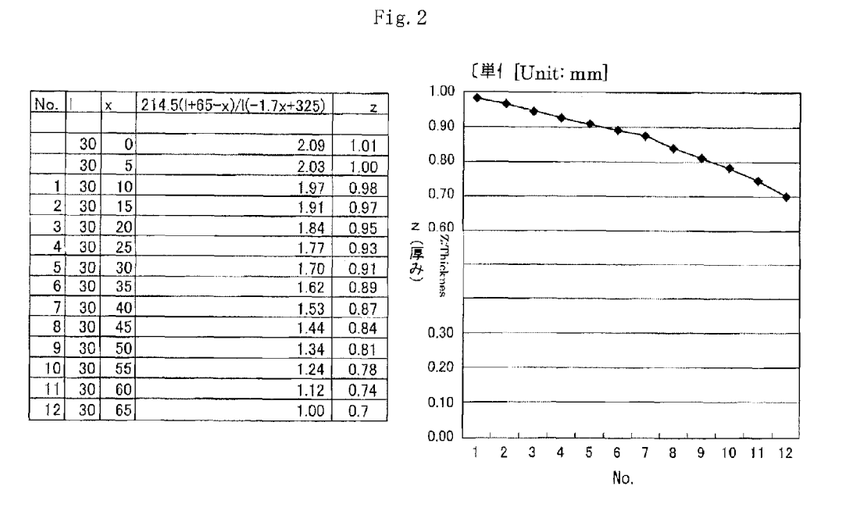
FIG. 2 shows a table and a graph to represent the thickness of the plate spring section of the temple member according to the first example of the present invention.

According to the first example, the spectacles frame is constituted by connecting a pair of right and left temple main bodies 1 to both ends of the front frame F (see FIG. 1). Further, regarding the temple main body 1, the plate spring section 11 made from a metallic plate material is formed to a side of the front frame F while to the rear side of the plate spring section 11a highly rigid section 12 whose bending rigidity is larger than that of the plate spring section is provided. To note, according to the present example, the highly rigid section 12 is provided with a metallic plate material or a core material coated with a synthetic resin material, on the rear end portion of which rigid section 12 an ear suspension section 12a in abutment with the lateral side of a wearer's head is formed.

Further, 'x' in FIG. 1 indicates a length of the plate spring section 11 from its frontal end to an arbitrary point P while '$X_0$' therein indicating a length thereof from its frontal end to its rear end. Then, 'y' therein indicates a vertical width of the plate spring section 11 at the arbitrary point P while '$Y_0$' therein indicates a vertical width thereof at its rear end. In addition, 'z' therein indicates a thickness of the plate spring section 11 at the arbitrary point P while '$Z_0$' therein indicating a thickness thereof at its rear end. Moreover, 'l' therein indicates a length of the highly rigid section 12 from its frontal end to the position A thereof in abutment with the lateral side of the head while 'F' therein indicating load applied outward from the position A.

According to the present example, the length of the plate spring section, the vertical width thereof at its frontal end, the vertical width thereof at its rear end, a thickness thereof at its rear end and a length of the highly rigid section 12 from its frontal end to the position A thereof in abutment with the lateral side of the head are defined as 65 mm ($X_0$=65), 5.0 mm, 3.3 mm ($Y_0$=3.3), 0.7 mm ($Z_0$=0.7) and 30 mm (l=30) respectively.

Further, according to the present example, the plate spring section 11 of the temple main body 1 is formed such that the vertical with thereof is narrowed or tapered with a predetermined ratio from its frontal side to its rear side. Then, it is arranged such that the thickness of the plate spring section satisfies the following equation 5 in relation with the vertical widths thereof, positions in the longitudinal direction thereof and the position A in abutment with the lateral side of the head at the highly rigid section 12 (see FIG. 2).

$$z = 0.7\sqrt{\frac{214.5(l+65-x)}{l(-1.7x+325)}} \quad \text{[Equation 5]}$$

Not to change the subject, the above equation 5 can be derived from the following method. In the first place, the following equation 6 is used for calculating the strain and area moment of inertial of the plate spring section 11. In turn, the following equation 7 is used for calculating the vertical width of the linearly tapered plate spring section 11.

$$\text{Strain } \varepsilon = \frac{z}{2\rho} = \frac{Mz}{2EI} \quad \text{[Equation 6]}$$

$$\text{Area Moment of Inertia } I = \frac{yz^3}{12}$$

※ $E$ is Young's modulus
$M$ is bending moment
$\rho$ is curvature radius $$y = -\frac{1.7}{65}x + 5.0 \quad (0 \le x \le 65) \quad \text{[Equation 7]}$$

Then, as illustrated in the following equation 8, the equations (1) and (2) showing the strain at the rear end portion of the plate spring section 11 and the strain thereof at the arbitrary point P respectively are calculated and 'z' to make the equations (1) and (2) equated is found, which leads to the above-mentioned equation 5.

[Equation 8]

Finding strain at $x = X_0 = 65$; $y = Y_0 = 3.3$; $z = Z_0 = 0.7$     (1)

$$\varepsilon = \frac{z}{2\rho} = \frac{Flz}{2EI} = \frac{12Flz}{2Eyz^3} = \frac{6Fl}{E \cdot 3.3 \cdot (0.7)^2}$$

Strain within the range of $x$ $(0 \le x \le 65)$     (2)

$$\varepsilon = \frac{z}{2\rho} = \frac{F(l+65-x)z}{2EI} = \frac{12F(l+65-x)z}{2Eyz^3} = \frac{6F(l+65-x)}{E \cdot \left(-\frac{1.7}{65}x + 5.0\right) \cdot z^2}$$

Finding $z$ to make the equations (1) and (2) equated $$z = 0.7\sqrt{\frac{l+65-x}{l} \cdot \frac{3.3}{-\frac{1.7}{65}x + 5.0}}$$

$$= 0.7\sqrt{\frac{214.5(l+65-x)}{l(-1.7x+325)}}$$

Figure 3:
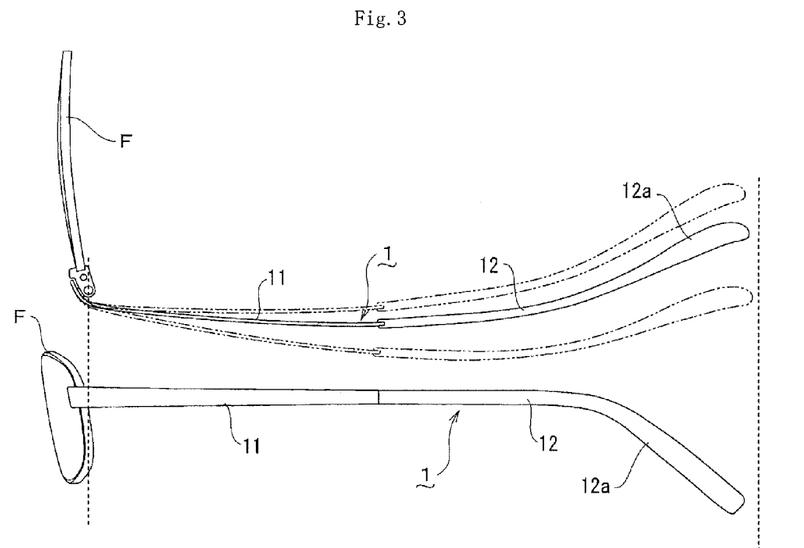
FIG. 3 is an explanatory view showing the state where the plate spring section of the temple member according to the first example of the present invention is flexed.

As described above, according to the present example, making the thickness of the plate spring section 11 such a size as to satisfy the equation 5 as mentioned above allows the same to be flexed with a substantially certain strain as shown in FIG. 3 when external force is applied from the abutment position A, which leads to improving on the sense of fitness on the part of wearers and the endurance of the spectacles frame.

Second Example

Figure 4:
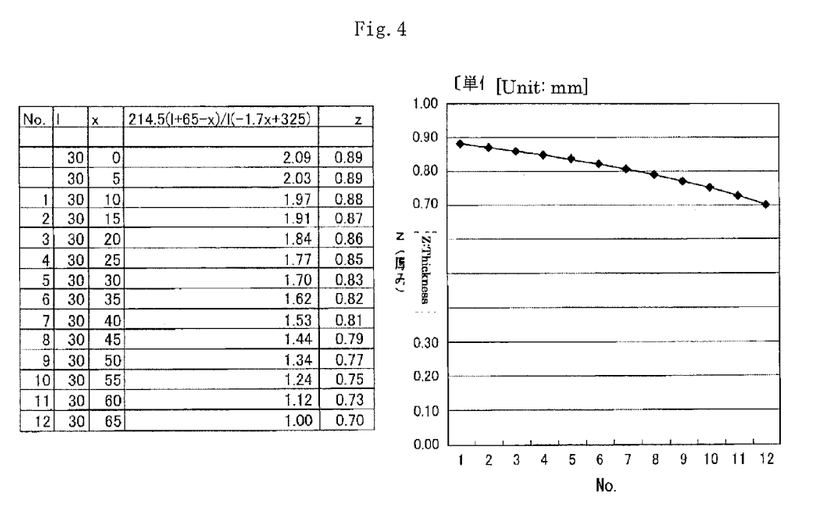
FIG. 4 shows a table and a graph to represent the thickness of the plate spring section of the temple member according to the second example of the present invention.

The second example of the present invention is explained below. In the present example, in the same way as the first example, the plate spring section 11 of the temple main body 1 is formed such that the vertical with thereof is narrowed or tapered with a predetermined ratio from its frontal side to its rear side. Then, it is arranged such that the thickness of the plate spring section satisfies the following equation 9 in relation with the vertical widths thereof, positions in the longitudinal direction thereof and the position A in abutment with the lateral side of the head at the highly rigid section 12 (see FIG. 4).

[Equation 9]

$$z = 0.7^3 \sqrt{\frac{214.5(1+65-x)}{1(-1.7x+325)}}$$

Not to change the subject, the above equation 9 can be derived from the following method. To begin with, the following equation 10 is used for calculating the curvature and area moment of inertia of the plate spring section 11 while the following equation 11 is used for calculating the vertical width of the linearly tapered plate spring section 11.

[Equation 10]

$$\text{Curvature} = \frac{1}{\rho} = \frac{M}{EI} \quad \text{Area Moment of Inertia} \quad I = \frac{yz^3}{12}$$

※ $E$ is Young's modulus
$M$ is bending moment
$\rho$ is curvature radius

[Equation 11]

$$y = -\frac{1.7}{65}x + 5.0 \quad (0 \le x \le 65)$$

Then, as shown in the following equation 12, the equation (1) denoting the curvature of the plate spring section 11 at its rear end and that (2) denoting the curvature thereof at the arbitrary point P are calculated and 'z' to make those equations (1) and (2) equated is found, which leads to the aforementioned equation 9.

[Equation 12]

Finding curvature at $x = X_0 = 65$; $y = Y_0 = 3.3$; $z = Z_0 = 0.7$ (1)

$$\frac{1}{\rho} = \frac{Fl}{EI} = \frac{12Fl}{Eyz^3} = \frac{12Fl}{E \cdot 3.3 \cdot (0.7)^3}$$

Curvature within the range of $x$ ($0 \le x \le 65$) (2)

$$\frac{1}{\rho} = \frac{F(1+65-x)}{EI} = \frac{12F(1+65-x)}{Eyz^3} = \frac{12F(1+65-x)}{E \cdot \left(-\frac{1.7}{65}x + 5.0\right) \cdot z^3}$$

Finding $z$ to make the equations (1) and (2) equated $$z = 0.7^3 \sqrt{\frac{1+65-x}{1} \cdot \frac{3.3}{-\frac{1.7}{65}x+5.0}}$$

$$= 0.7^3 \sqrt{\frac{214.5(1+65-x)}{1(-1.7x+325)}}$$

Third Example

Figure 5:
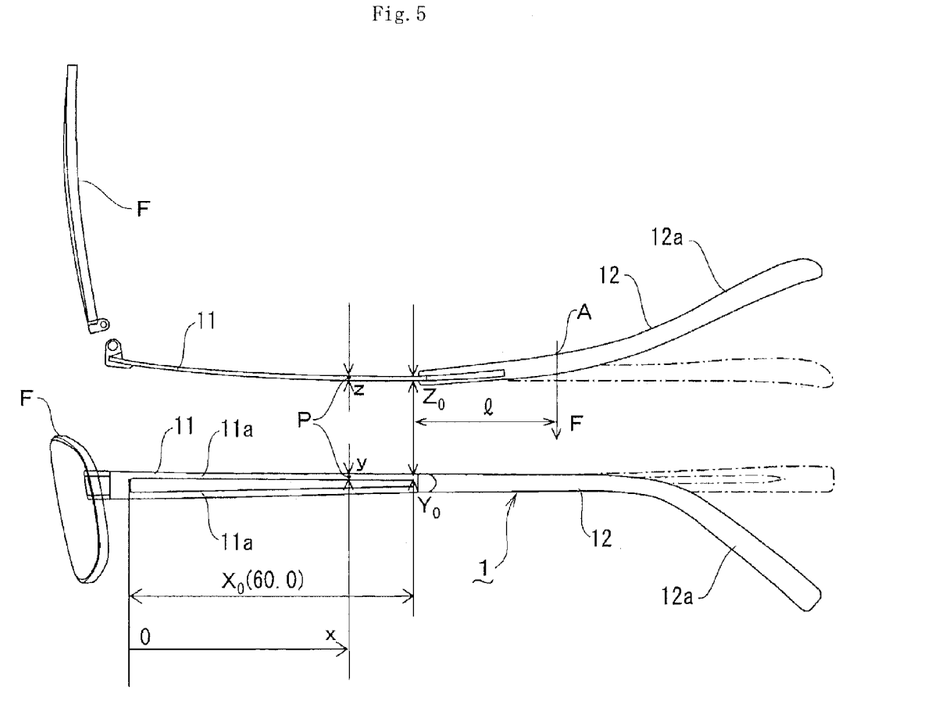
FIG. 5 shows a side view and a plan view of the temple member of the spectacles frame according to the third example of the present invention.

Then, the third example of the present invention is explained with reference to FIG. 5, in which the plate spring section 11 of the temple main body 1 is formed such that the thin plate portions 11a and 11a are vertically and symmetrically disposed with their in-between portion hollowed out. Further, the length of the plate spring section 11 and the thickness of each thin plate portion 11a at its rear end portion are defined as 60 mm ($X_0=60$) and 0.8 mm ($Z_0=0.8$) respectively while the vertical width thereof is defined uniformly as 1.4 mm ($Y_0=y=1.4$). Then, the thickness of each thin plate portion 11a is calculated by way of the following equation 13, in which it is arranged such that the strain of the plate spring section 11 is rendered substantially constant.

[Equation 13]

① Thickness $z$ is changed with the width ($y = 1.4$) constant (1)

Strain at $x = X_0 = 60$; $y = Y_0 = 1.4$;
$z = Z_0 = 0.8$ is considered constant $$\varepsilon = \frac{z}{2\rho} = \frac{Flz}{2EI} = \frac{12Flz}{2Eyz^3} = \frac{6Fl}{E \cdot 1.4 \cdot (0.8)^2}$$

Strain at $x$ is expressed as: (2)

$$\varepsilon = \frac{z}{2\rho} = \frac{F(1+60-x)z}{2EI} = \frac{12F(1+60-x)z}{2Eyz^3} = \frac{6F(1+60-x)}{E \cdot 1.4 \cdot z^2}$$

Finding $z$ to make the equations (1) and (2) equated $$z = 0.8 \sqrt{\frac{1+60-x}{1}}$$

On the other hand, when the thickness of each thin plate portion 11a (plurality in number) of the plate spring section 11 is defined uniformly as 0.8 mm ($Z_0=z=0.8$), the vertical width of the plate spring section is calculated by way of the following equation 14, thereby, the strain of the plate spring section 11 being rendered substantially constant.

[Equation 14]

② The width $y$ is changed with the thickness ($z = 0.8$) constant (3)

Strain at $x = X_0 = 60$; $y = Y_0 = 1.4$;
$z = Z_0 = 0.8$ is considered constant $$\varepsilon = \frac{z}{2\rho} = \frac{Flz}{2EI} = \frac{12Flz}{2Eyz^3} = \frac{6Fl}{E \cdot 1.4 \cdot (0.8)^2}$$

Strain at $x$ is expressed as: (4)

$$\varepsilon = \frac{z}{2\rho} = \frac{F(1+60-x)z}{2EI} = \frac{12F(1+60-x)z}{2Eyz^3} = \frac{6F(1+60-x)}{E \cdot y \cdot (0.8)^2}$$

Finding $y$ to make the equations (3) and (4) equated $$y = \frac{1.4(1+60-x)}{1}$$

Fourth Example

The fourth example of the present invention is explained below, in which in the same way as the above-mentioned third example, the plate spring section 11 of the temple 1 main body is formed such that the thin plate portions 11a and 11a are vertically and symmetrically disposed with their in-between portion hollowed out so as to make the vertical width of each thin plate portion 11a uniform while as for the thickness of the plate spring section 11, the thickness of each thin plate portion 11a is calculated by way of the following equation 15, in which the curvature of the plate spring section 11 is rendered substantially constant.

[Equation 15]

① Thickness $z$ is changed with the width ($y = 1.4$) constant (3)
Curvature at $x = X_0 = 60$; $y = Y_0 = 1.4$;
$z = Z_0 = 0.8$ is considered constant $$\frac{1}{\rho} = \frac{Fl}{EI} = \frac{12Fl}{Eyz^3} = \frac{12Fl}{E \cdot 1.4 \cdot (0.8)^3}$$

Curvature at $x$ is expressed as: (4)

$$\frac{1}{\rho} = \frac{F(1+60-x)}{EI} = \frac{12F(1+60-x)}{Eyx^3} = \frac{12F(1+60-x)}{E \cdot 1.4 \cdot z^3}$$

Finding $z$ to make the equations (3) and (4) equated $$z = 0.8 \sqrt[3]{\frac{1+60-x}{1}}$$

On the other hand, when the thickness of each thin plate portions 11a (plurality in number) of the plate spring section 11 is fixed to 0.8 mm ($Z_0=z=0.8$), the vertical width of the plate spring section 11 is calculated by way of the following equation 16, thereby, the curvature of the plate spring section 11 being rendered substantially constant.

[Equation 16]

② Width $y$ is changed with thickness ($z = 0.8$) constant (2)
Curvature at $x = X_0 = 60$; $y = Y_0 = 1.4$;
$z = Z_0 = 0.8$ is considered constant
Curvature at $x$ is expressed as:

$$\frac{1}{\rho} = \frac{F(1+60-x)}{EI} = \frac{12F(1+60-x)}{Eyz^3} = \frac{12F(1+60-x)}{E \cdot y \cdot (0.8)^3}$$

Finding $y$ to make the equations (1) and (2) equated $$y = \frac{1.4(1+60-x)}{1}$$

The present invention is substantially embodied as described above, but it is not limited to the illustrated embodiments. It may be modified into various manners within the scope of the accompanying patent claims. For instance, the plate spring section 11 of the temple main body 1 is made not only from metallic materials such as titanium alloy, but also from plastic materials.

Further, as for the configuration of the plate spring section 11 of the temple main body 1, when the vertical width of the plate spring section 11 is rendered constant or defined as the linear function or quadratic function of 'x' and as such, the thickness of the plate spring section 11 is calculated such that it satisfies the following equation 1 or 3, thereby, the strain or curvature of the curved plate spring section as a whole being substantially rendered constant.

[Equation 1]

$$z = Z_0 \sqrt{\frac{Y_0(\ell + X_0 - x)}{y\ell}}$$

x: Length of the plate spring section from its frontal end to its arbitrary point P
$X_0$: Length of the plate spring section from its frontal end to its rear end
y: Vertical width of the plate spring section at its arbitrary point P
$Y_0$: Vertical width of the plate spring section at its rear end
z: Thickness of the plate spring section at its arbitrary point P
$Z_0$: Thickness of the rear end of the plate spring section
l: Length of the highly rigid section from its frontal end to the position A in abutment with the lateral side of the head (l>0)
*y is a constant or a function of X

[Equation 2]

$$y = \frac{Z_0^2 Y_0(\ell + X_0 - x)}{z^2 \ell}$$

x: Length of the plate spring section from its frontal end to its arbitrary point P
$X_0$: Length of the plate spring section from its frontal end to its rear end
y: Vertical width of the plate spring section at its arbitrary point P
$Y_0$: Vertical width of the plate spring section at its rear end
z: Thickness of the plate spring section at its arbitrary point P
$Z_0$: Thickness of the rear end of the plate spring section
l: Length of the highly rigid section from its frontal end to the position A in abutment with the lateral side of the head (l>0)
*z is a constant or a function of X Further, as with the thickness of the plate spring section 11, it is rendered not only constant, but also may well be narrowed or tapered from its frontal side to its rear side with a predetermined ratio (or the configuration by which the thickness of the plate spring section 11 is defined as the linear or quadratic function of 'x'), in which case the vertical width of the plate spring section 11 is calculated such that it satisfies the above equation 2 or the following equation 4, thereby, the strain or curvature of the curved plate spring section as a whole being rendered constant.

[Equation 3]

$$z = Z_0^3 \sqrt{\frac{Y_0(\ell + X_0 - x)}{y\ell}}$$

x: Length of the plate spring section from its frontal end to its arbitrary point P
$X_0$: Length of the plate spring section from its frontal end to its rear end
y: Vertical width of the plate spring section at its arbitrary point P
$Y_0$: Vertical width of the plate spring section at its rear end
z: Thickness of the plate spring section at its arbitrary point P
$Z_0$: Thickness of the rear end of the plate spring section
l: Length of the highly rigid section from its frontal end to the position A in abutment with the lateral side of the head (l>0)
*y is a constant or a function of X

[Equation 4]

$$y = \frac{Z_0^3 Y_0(\ell + X_0 - x)}{z^3 \ell}$$

x: Length of the plate spring section from its frontal end to its arbitrary point P
$X_0$: Length of the plate spring section from its frontal end to its rear end
y: Vertical width of the plate spring section at its arbitrary point P
$Y_0$: Vertical width of the plate spring section at its rear end
z: Thickness of the plate spring section at its arbitrary point P
$Z_0$: Thickness of the rear end of the plate spring section
l: Length of the highly rigid section from its frontal end to the position A in abutment with the lateral side of the head (l>0)
*z is a constant or a function of X Moreover, when the plate spring section 11 of the temple main body 1 is hollowed out, it may well be arranged such that three or more thin plate sections 11a, 11a, 11a and so on are disposed in parallel or the thickness of each thin plate section 11a changes from each other.

Furthermore, it may well be arranged such that the plate spring section is formed on the front frame or brace bars of the spectacles frame and so forth other than on the temple members in such a manner that it is prepared by calculating such thickness, vertical width and length thereof as to make the strain or curvature thereof as a whole substantially constant upon the same being curved when load is applied to one end or both ends thereof. It is of course that any one of the afore-mentioned modifications belongs to the technical scope of the present invention.

INDUSTRIAL APPLICABILITY

In recent years, a pair of spectacles is widely used not only for correcting eyesight, but also as one of fashion accessories, but the endurance of the spectacles frame and the sense of fitness on wear are attached more importance when the consumers select spectacles. Under such circumstances, the spectacles frame and the temple members thereof according to the present invention allow endurance of such frame and the sense of fitness on wear to further improve in comparison with the prior art, so that the industrial applicability of the present invention is very high.

NOMENCLATURE 1 temple main body
11 plate spring section
11a thin plate portion
12 highly rigid section
12a ear suspension section
F front frame
A abutment position with lateral side of head
P arbitrary point

The invention claimed is:

1. A pair of right and left temple members of a spectacles frame, frontal end portions of which members are connected to both ends of a front frame and at a rear end portion of which members each an ear suspension section in abutment with a lateral side of a wearer's head is provided, wherein a temple main body comprises a plate spring section formed to a side of the front frame; and a highly rigid section formed to a rear side of the plate spring section with the ear suspension section inclusive and having bending rigidity higher than that of the plate spring section while the plate spring section is formed in one of such manners that its vertical width is rendered constant and tapered with narrowed by a predetermined ratio from its frontal side to its rear side as well as such that a thickness of the plate spring section satisfies the following equation in relation with vertical widths of the plate spring section, positions in a longitudinal direction thereof and an abutment position with the lateral side of the head at the highly rigid section:

$$z = Z_0 \sqrt{\frac{Y_0(l + X_0 - x)}{y\ell}}$$

x: Length of the plate spring section from its frontal end to its arbitrary point P
$X_0$: Length of the plate spring section from its frontal end to its rear end
y: Vertical width of the plate spring section at its arbitrary point P
$Y_0$: Vertical width of the plate spring section at its rear end
z: Thickness of the plate spring section at its arbitrary point P
$Z_0$: Thickness of the rear end of the plate spring section
l: Length of the highly rigid section from its frontal end to the position A in abutment with the lateral side of the head (l>0)
*y is a constant or a function of X.

2. A pair of right and left temple members of a spectacles frame, frontal end portions of which members are connected to both ends of a front frame and at a rear end portion of which members each an ear suspension section in abutment with a lateral side of a wearer's head is provided, wherein a temple main body comprises a plate spring section formed to a side of the front frame; and a highly rigid section formed to a rear side of the plate spring section with the ear suspension section inclusive and having bending rigidity higher than that of the plate spring section while the plate spring section is formed in one of such manners that its vertical width is rendered constant and tapered with narrowed by a predetermined ratio from its frontal side to its rear side as well as such that a thickness of the plate spring section satisfies the following equation in relation with thicknesses of the plate spring section, positions in a longitudinal direction thereof and an abutment position with the lateral side of the head at the highly rigid section:

$$z = Z_0^3 \sqrt{\frac{Y_0(\ell + X_0 - x)}{y\ell}}$$

x: Length of the plate spring section from its frontal end to its arbitrary point P
$X_0$: Length of the plate spring section from its frontal end to its rear end
y: Vertical width of the plate spring section at its arbitrary point P
$Y_0$: Vertical width of the plate spring section at its rear end
z: Thickness of the plate spring section at its arbitrary point P
$Z_0$: Thickness of the rear end of the plate spring section
l: Length of the highly rigid section from its frontal end to the position A in abutment with the lateral side of the head (l>0)
*y is a constant or a function of X.

3. The temple members according to claim 1 wherein the plate spring section of the temple main body is formed such that thin plate portions are vertically disposed with their in-between portion hollowed out as well as the thin plate portions each satisfying conditions on the thicknesses and the vertical widths of the plate spring section.

4. The temple members according to claim 2 wherein the plate spring section of the temple main body is formed such that thin plate portions are vertically disposed with their in-between portion hollowed out as well as the thin plate portions each satisfying conditions on the thicknesses and the vertical widths of the plate spring section.

5. A pair of right and left temple members of a spectacles frame, frontal end portions of which members are connected to both ends of a front frame and at a rear end portion of which members each an ear suspension section in abutment with a lateral side of a wearer's head is provided, wherein a temple main body comprises a plate spring section formed to a side of the front frame; and a highly rigid section formed to a rear side of the plate spring section with the ear suspension section inclusive and having bending rigidity higher than that of the plate spring section while the plate spring section is formed in one of such manners that its thickness is rendered constant and tapered with narrowed by a predetermined ratio from its frontal side to its rear side as well as such that a vertical width of the plate spring section satisfies the following equation in relation with vertical widths of the plate spring section, positions in a longitudinal direction thereof and an abutment position with the lateral side of the head at the highly rigid section:

$$y = \frac{Z_0^2 Y_0 (\ell + X_0 - x)}{z^2 \ell}$$

x: Length of the plate spring section from its frontal end to its arbitrary point P
$X_0$: Length of the plate spring section from its frontal end to its rear end
y: Vertical width of the plate spring section at its arbitrary point P
$Y_0$: Vertical width of the plate spring section at its rear end
z: Thickness of the plate spring section at its arbitrary point P
$Z_0$: Thickness of the rear end of the plate spring section
l: Length of the highly rigid section from its frontal end to the position A in abutment with the lateral side of the head (l>0)
*z is a constant or a function of X.

6. A pair of right and left temple members of a spectacles frame, frontal end portions of which members are connected to both ends of a front frame and at a rear end portion of which members each an ear suspension section in abutment with a lateral side of a wearer's head is provided, wherein a temple main body comprises a plate spring section formed to a side of the front frame; and a highly rigid section formed to a rear side of the plate spring section with the ear suspension section inclusive and having bending rigidity higher than that of the plate spring section while the plate spring section is formed in one of such manners that its thickness is rendered constant and tapered with narrowed by a predetermined ratio from its frontal side to its rear side as well as such that a vertical width of the plate spring section satisfies the following equation in relation with thicknesses of the plate spring section, positions in a longitudinal direction thereof and an abutment position with the lateral side of the head at the highly rigid section:

$$y = \frac{Z_0^3 Y_0 (\ell + X_0 - x)}{z^3 \ell}$$

x: Length of the plate spring section from its frontal end to its arbitrary point P
$X_0$: Length of the plate spring section from its frontal end to its rear end
y: Vertical width of the plate spring section at its arbitrary point P
$Y_0$: Vertical width of the plate spring section at its rear end
z: Thickness of the plate spring section at its arbitrary point P
$Z_0$: Thickness of the rear end of the plate spring section
l: Length of the highly rigid section from its frontal end to the position A in abutment with the lateral side of the head (l>0)
*z is a constant or a function of X.

* * * * *